United States Patent [19]

Gallagher

[11] 4,011,856
[45] Mar. 15, 1977

[54] SOLAR FLUID HEATER

[75] Inventor: Robert George Gallagher, El Cajon, Calif.

[73] Assignee: Energy Systems, Inc., El Cajon, Calif.

[22] Filed: Mar. 28, 1975

[21] Appl. No.: 563,091

[52] U.S. Cl. .............................. 126/271; 165/171; 165/76
[51] Int. Cl.² .......................................... F24J 3/02
[58] Field of Search ............ 126/270, 271; 165/76, 165/165, 171, 172, 133; 237/1 A

[56] References Cited

UNITED STATES PATENTS

| 966,070 | 8/1910 | Bailey | 126/271 |
|---|---|---|---|
| 1,753,227 | 4/1930 | Wheeler et al. | 126/271 |
| 2,274,492 | 2/1942 | Modine | 126/271 |
| 3,039,453 | 6/1962 | Andrassy | 126/271 |

FOREIGN PATENTS OR APPLICATIONS

| 1,027,613 | 5/1953 | France | 165/172 |
|---|---|---|---|
| 235,563 | 2/1926 | United Kingdom | 126/270 |
| 403,899 | 1/1934 | United Kingdom | 165/133 |

Primary Examiner—Kenneth W. Sprague
Assistant Examiner—James C. Yeung
Attorney, Agent, or Firm—Frank D. Gilliam

[57] ABSTRACT

A solar heater for heating a fluid passing through a plurality of side by side positioned solar panels. The solar panels are formed of heat conducting material with an upper solar energy exposed surface covered with a radiant heat absorbing material having high heat absorbing characteristics. A conduit formed of heat conducting material is held in place by an open circular channel of a diameter less than the conduit and positioned below the longitudinal center line of the solar panel. The solar panel portions on each side of the center line slopes downward away from the center. The respective ends of the conduits are connected to a separate common header. One header delivers ambient fluid to the conduits and the other removes heated fluid. An insulated housing for containing the solar panel comprises a bottom, side panels, panel supports supported by the bottom panel, insulating material positioned between the bottom panel and the lower surface of the solar panels and at least one transparent panel spaced above the solar panels and sealed to the atmosphere. The solar panels are secured in a fixed side by side physical contacting relationship. The circular channel firmly secures the conduit therein at ambient temperature. When the heater is exposed to solar energy, the heat expands the solar panels and conduit thereby providing an increased pressure between the adjacent panels as well as between the channel and the conduit. Aperatures are provided at selected positions along the solar panels near the longitudinal center. Fasteners partially passing through the panel aperatures and secured to the panel supports may be provided to increase the plysical pressures between the solar panels and the channel and conduit at ambient temperature.

19 Claims, 5 Drawing Figures

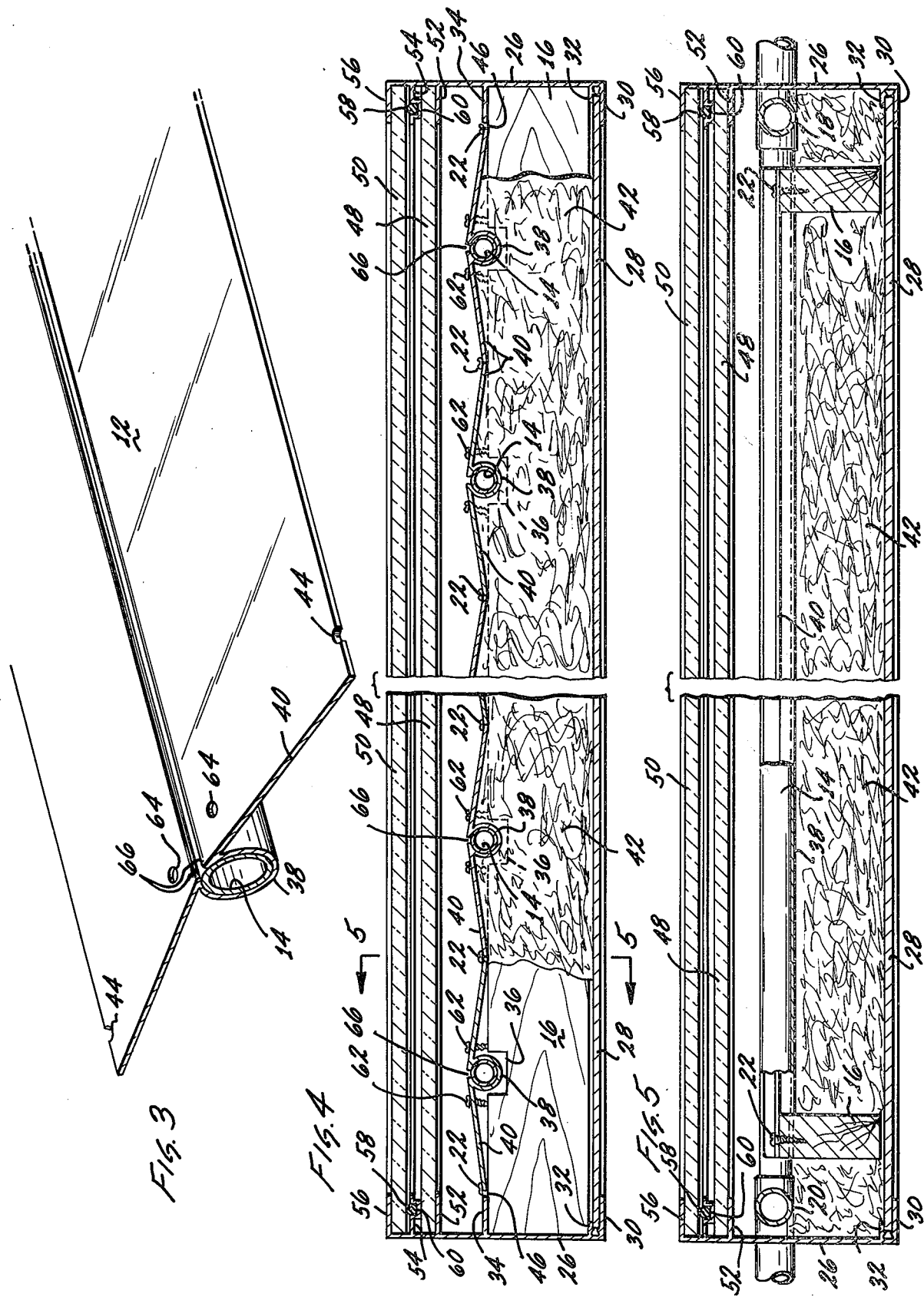

SOLAR FLUID HEATER

BACKGROUND OF THE INVENTION

The present invention relates to a solar energy heater and more specifically to a solar heater for heating a fluid.

A considerable number of solar fluid heating devices presently exist. The existing devices are found to have various deficiencies preventing optimum conversion of solar energy to a useful level of heat energy.

W. J. Bailey in U.S. Pat. No. 966,070 teaches the construction of solar panels by attaching the fluid carrying conduit along substantially a single line of physical contact by means of soldering or the like. This single and narrow contact limits the heat transfer between the solar panel surface and the conduit. Further teachings provide forming the solar panels upward from the lower center line of the conduit. This "cuping" of the conduit within the solar panel limits the maximum solar exposure of the panel to a nearly direct perpendicular sun to panel positionally relationship, thus when the sun is off the perpendicular the conduit will shield the panel from direct solar exposure. Bailey fails to teach an adjacent contact between the various solar panels so that all solar panels will have a uniform heat transfer therebetween to insure a uniform heating of the entire plurality of side by side solar panels to prevent cold spots.

The T. B. Modine U.S. Pat. No. 2,274,492, teaches connecting a flat panel to the conduit along a single surface contact area leaving substantially all of the conduit free from solar panel contact and thus preventing uniformly heating of its entire outer surface.

The S. Andrassy U.S. Pat. No. 3,039,453, teaches the use of a plastic conduit enclosed in a channel in a flat metal panel. The patent fails to teach the necessity of a tight physical connection between the channels of the panel and the plastic conduit or any means for maintaining a sufficient degree of physical pressure therebetween to insure a maximum heat transfer between the panels and the outer surface of the plastic conduit. The plastic used in the construction of the conduit is not considered a good heat conductor but rather a poor heat insulator, thus lack of physical pressure between the solar panels mentioned and lack of conduction between the metal panel and the plastic conduit combine to make an inefficient solar liquid heater.

These and various other problems were not satisfactorily resolved until the emergence of the instant invention.

SUMMARY OF THE INVENTION

In accordance with the present invention, there is provided an improved solar fluid heater for an efficient collection of solar energy as well as an efficient transfer of the collected energy to a fluid to be heated. The solar heater is simple to construct, low in cost, light in weight, has a long life and is more efficient than those now available.

The novel features which are considered as characteristic of the invention are set forth with particularity in the appended claims. The invention itself, however, as to its construction and obvious advantages will be best understood from the following description of the specific embodiment when read with the accompanying drawings.

BRIEF DESCRIPTION OF THE DRAWINGS

FIG. 3 is a partial perspective view of a single panel from the solar liquid heated of FIG. 1.

FIG. 4 is a partial longitudinal cross-sectional view of the solar liquid heater of FIG. 1.

FIG. 5 is a partial end view of the solar liquid heater of FIG. 4 taken along lines 5—5.

DETAILED DESCRIPTION OF THE PREFERRED EMBODIMENTS OF THE INVENTION

Figure 1:
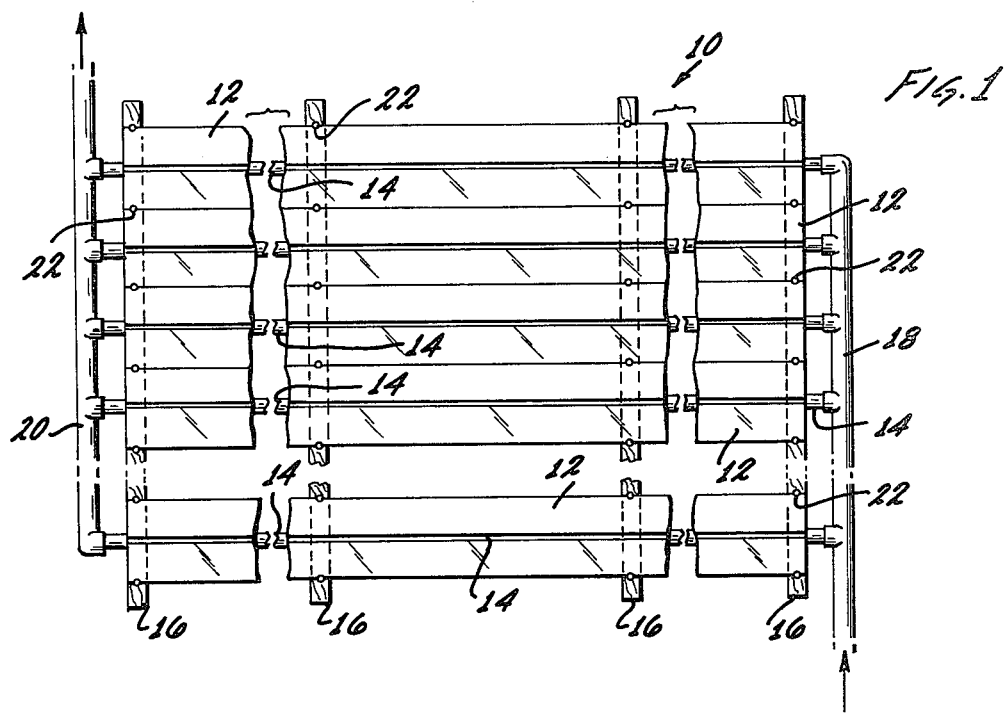
FIG. 1 is a plan view of the basic elements of the solar liquid heater.

The same reference numerals are used throughout the drawings and specification to denote a similar item of the invention.

FIG. 1 shows a plan view of the basic elements making up the solar liquid heater of the invention. The various other figures show the elements of FIG. 1 in more specific detail. The solar fluid heater 10 is shown constructed of a plurality of side by side heat collecting panels 12. Each panel has a conduit 14 confined within and positioned below the longitudinal center of the upper panel surface. The panels are shown supported by support members 16, four being shown for a typical 4-foot by 8-foot panel. Headers 18, 20 for delivering ambient fluid to the heater and carrying away the heated liquid from the heater respectively are soldered, brazed or otherwise suitably connected to common ends of the conduit 14 to form a leak proof construction and thereby increase the efficiency of the heater. Means 22 secures the panels 12 in a fixed position as shown.

Figure 2:
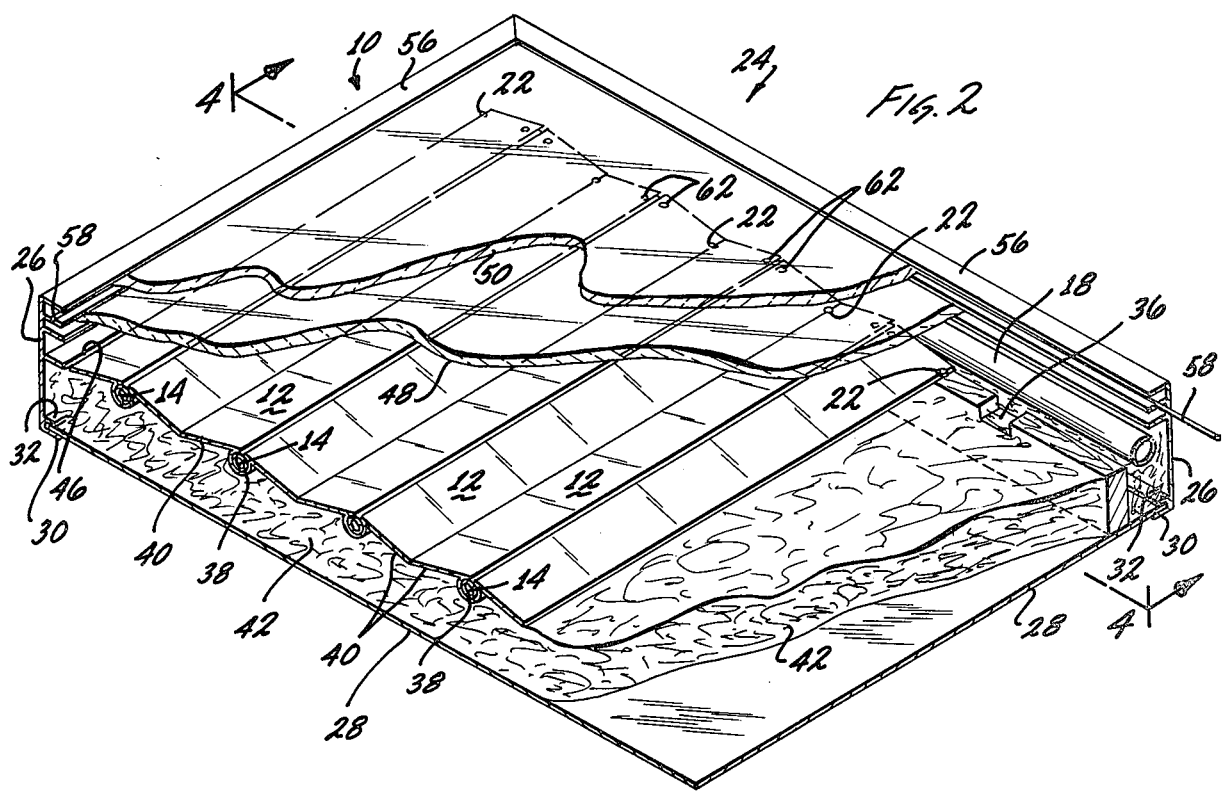
FIG. 2 is a partial perspective detailed view of the solar liquid heater.

Referring now to FIGS. 2, 4 and 5, the solar liquid heater of FIG. 1 is shown in more specific detail. The basic solar liquid heater 10 is confined within a container 24 for the purpose of confining the heat collected from the sun and prevent cooling by the surrounding atmosphere. The side walls 26 are generally constructed from extruded aluminum and are provided with various interior protrusions hereinafter described. It should be obvious that metal material, other than aluminum, can be utilized in same manner as well as channeled wood.

A base panel 28 is contained by side wall protrusion 30, 32 and is positioned at the lower portion of side wall 26. The base panel 28 is typically constructed of masonite, plywood or similar stiff, flat material.

Supports 16 rest upon or are connected to the base panel 28 as shown and snugly nest between side wall protrusion 32 and 34. Notches 36 are formed along the supports 16 so as to allow the open circular channels 38 of panels 12 to fit freely therein.

The void provided between the base panel 28 and the lower surface 40 of the panels 12 is filled with a good insulating material 42 which may be fibre glass, foam plastic, saw dust or the like.

The panels 12 are positioned along supports 16 in a manner shown by the various figures. Each panel has a firm, physical contact with each adjacent panel and is secured in that position by fastener means 22, such as screws as shown in FIGS. 4 and 5. The fasteners pass partially through semi-circular aperatures 44 cut into the outer edge of the panels. The abuting aperatures form a circular opening between adjacent panels of a sufficient diameter to allow the fastener to pass through while the panels continue to maintain a firm physical contact between their edges. The semi-circular openings in the two outer most panels by necessity must ride against their associated fastener means 22 to prevent movement of the endmost panels. The endmost panels 12 are positioned so as to have a space 46 between the panel edge and protrusion 34 of the side wall 26 so as to prevent an undesirable transfer of heat from the panels to the side walls.

Two transparent panels 48, 50 are utilized in the preferred embodiment of the invention. The panels are generally made of tempered glass or the like, but the invention may be practiced equally well by the use of transparent panels of plastic or the like. Panel 48 is positioned above and spaced from the uppermost surface of the panels 12 so as to provide a dead air space therebetween. The space between panels 48 and the uppermost portion of the upper surface of the panels 12 should be at least a half of an inch long. The panel 48 is confined between side wall protrusions 52, 54. Positioned above and spaced from panel 48 by at least three-eights of an inch is a similar panel 50. The panel 50 is confined between side wall protrusion 54 and 56. In some applications, panel 48 may be omitted. Panel 50 also forms the top of container 26 and, therefore, to contain the heated air between the enclosed panels 12 and panel 50 a seal 58 is provided between side wall protrusion 54 and the lower portion of panel 50. The seal 58 is preferably formed from resilient material having a circular cross-sectional configuration. The seal 58 nests in a slot 60 provided in protrusion 54. The panel 50 deforms the resilient seal 58 between the slot 60 and its lower surface when the panel is installed, thereby, forming a pressure seal therebetween. A seal 60 of any configuration suitable to form a pressure seal as described may be used to practice the invention.

Referring now specifically to FIG. 3 as well as the like components in the various other figures. The panels 12 are constructed of metal or a like formable material that has high heat conductive characteristics. In the preferred embodiment the panel is formed from aluminum because of reduced material cost and excellent heat conductivity. The upper or solar energy exposed surface of the panel is coated with a radiant energy absorbent coating having a high efficiency. The preferred coating is black in color and is either electrostatically coated, electro-plated, or anodized on the panel surface. The under surface of the panels, those away from radiant energy exposure, are generally untreated except for a preservative which may be needed to prevent deterioration over an extended time span.

Positioned along the longitudinal center line of the panel 12 is a fluid carrying conduit 14. The conduit is positioned and held firmly within the open circular channel 38 of the panel 12. The channel diameter is slightly less than the conduit diameter to ensure a good mechanical connection between the channel walls and the outer surface of the conduit to ensure maximum heat transfer therebetween. The panels are mounted in edge contacting relationship, as hereinbefore described, to ensure sufficient pressure at the contacting surfaces of the panels. An additional edge pressure applying means 62 is shown as a screw with an enlarged head surface passing partially through aperature 64 (restricted by the enlarged head) and into a support 16. As the edge pressure applying means is forced downward into the support, the panel is likewise forced downward thereby applying additional force at the edge of the panel. A plurality of means 62 on each side of the panel center may be required depending on the amount of additional force desired. As can be seen by the various figures, the channel 38 forms an incomplete circular cross-sectional configuration at opening 66. This opening 66 allows the panel to be sprung downward thereby expanding the channel 38 to receive the enlarged diameter conduit 14 therein. When the expanding force is removed, the natural spring or elasticity of the panel material returns the channel to its normal diameter thereby causing the channel to grip the conduit. The opening also provides the required independent movement of the portion of the panel effected by the edge pressure applying means.

The panels are secured together and edge pressure applied, as hereinbefore described, at an ambient temperature (any convenient temperature below the panel operating temperature) so that when the panels are exposed to radiant energy and their temperatures rise the edge pressure as well as the conduit holding pressure will rise to ensure maximum heat transfer between the panels, the conduit and the fluid within the conduit.

The cross-sectional panel configuration, as shown by the various figures is downward sloping from the center opening 66 to their outer edges at an angle of between 5° and 15°. An optimum angle is approximately 8°. This sloping feature provides a more direct surface area exposure to perpendicular radiant energy as the sun moves during the day. The angled surface of the panel collects radiant energy in the same manner that the facets of a gem reflect light energy striking from different angles. In addition, the angled surfaces effectively provide more surface area to the panel for a given width.

The operation of the solar fluid heater described is basic and should be easily understood as to operation. A simple explanation is hereinafter provided.

The apparatus comprises a sealed container having a transparent top and an intermediately positioned second transparent plate with an air space therebetween through which radiant energy from the suns rays will penetrate. Positioned in this sealed container are a pair of header pipes connected to a plurality of conduits connected to a like number of panels. The sun's rays strike the panels, the heat being absorbed in the latter and is transferred from the panels through the conduit walls to the fluid by conduction. As ambient fluid is passed through the conduits it is warmed by the heat transfer and leaves the conduit at an elevated temperature.

The invention may be embodied in other specific forms without departing from the spirit or essential characteristics thereof. The present embodiments are, therefore, to be considered in all aspects as illustrative and not restrictive. The scope of the invention being indicated by the appended claims rather than the foregoing description and all changes which come within the meaning and range of equivalency of the claims are therefore, intended to be embraced therein.

What is claimed to be new and useful and desired to be secured by U.S. Letters Patent is:

1. A solar energy fluid heater comprising:
   an open housing having rigid bottom and side panels;
   a plurality of abutting solar panels for collecting solar energy positioned within said housing, said solar panels each having an upper surface positioned below the opening in said housing for collecting solar energy, an open circular channel formed in the center portion of said panel having an opening smaller than the diameter of said channel along the longitudinal center of the solar panel, said channel being below said opening and said upper surface and the portions of the upper surface adjacent each side of said opening having a linear downward slope;

a conduit member positioned within said channel said conduit having a diameter greater than the relaxed diameter of said channel and a length sufficiently long to extend from each end of said solar panel;

header members one connecting each adjacent end of said conduit and extending to the exterior of said housing;

a plurality of support members having a spaced apart relationship positioned along said bottom panel of said housing for spacing said solar panels from said bottom panel;

insulation means positioned between said solar panels and said bottom;

at least one panel of translucent material spaced above said upper surface of said solar panel having a sealed relationship with said side panels and forming a closure for the opening of said housing; and pressure applying means for securing the edges of the adjacent panels in firm physical contact to ensure heat transfer between said adjacent panels by conduction.

2. The invention as defined in claim 1, wherein said solar panels are constructed of an efficient heat conducting material.

3. The invention as defined in claim 2, wherein said material is aluminum.

4. The invention as defined in claim 1, wherein said upper surface of said panels have a high absorbent, radiant energy coating.

5. The invention as defined in claim 1, wherein the slope angle is within the range of 5° to 15°.

6. The invention as defined in claim 5, wherein said slope angle is approximately 8-degrees.

7. The invention as defined in claim 4, wherein said coating is electrostatically applied.

8. The invention as defined in claim 4, wherein said coating is painted on.

9. The invention as defined in claim 1, wherein additional pressure applying means for creating pressure between the panel and conduit to ensure heat transfer between the edges of adjacent panels and between the panel and conduit by conduction.

10. The invention as defined in claim 1, wherein said conduit is formed of copper.

11. A solar heat collector comprising:

an elongated heat collecting panel portion having solar energy absorbent material on its upper exposed surface and a circular channel formed along the longitudinal center thereof, said channel having its largest area positioned below said upper surface and non-continuous along its upper center surface forming a continuous slot therealong, said upper exposed surface adjacent each side of said slot slopes downward therealong with the outer surface fixedly positioned;

a fluid carrying conduit is positioned within said channel below said upper exposed surface and is substantially enclosed thereby said conduit having a length greater than said channel so as to extend beyond each end thereof and a diameter than the relaxed diameter of said channel for securing said conduit within said channel by mechanical force; and pressure applying means for securing the edges of said panel in firm physical position to maintain said mechanical force between said channel and conduit as the temperature of the panel increases to insure heat transfer between said panel and conduit by conduction.

12. The invention as defined in claim 11, wherein said panel is formed from aluminum.

13. The invention as defined in claim 11, wherein said conduit is formed from copper.

14. The invention as defined in claim 11, wherei the slope angle is within the range of 5° to 15°.

15. The invention as defined in claim 14, wherein said slope angle is approximately 8°.

16. The invention as defined in claim 11, wherein said panel is formed from aluminum and said conduit from copper.

17. The invention of claim 11, wherein said solar energy absorbent material is plated on said panel.

18. The invention of claim 11, wherein said solar energy absorbent material is painted on said panel.

19. The invention of claim 11, wherein said solar energy absorbent material is an anodized coating.

* * * * *